United States Patent [19]

Grosinger et al.

[11] 4,073,195

[45] Feb. 14, 1978

[54] LOCKING MECHANISM

[76] Inventors: Matityahu Grosinger, Sokolov Str. 16, Bnei Brak; Mordechai Salomon, Wilson Str. 5, Tel Aviv, both of Israel

[21] Appl. No.: 717,904

[22] Filed: Aug. 26, 1976

[30] Foreign Application Priority Data

Sept. 5, 1975 Israel ........................................ 48058

[51] Int. Cl.[2] ............................................ F16H 21/16

[52] U.S. Cl. ............................................ 74/25; 292/36

[58] Field of Search ............... 74/110, 25, 53; 292/34, 292/36, 40

[56] References Cited

U.S. PATENT DOCUMENTS

| | | | |
|---|---|---|---|
| 1,617,682 | 2/1927 | Gibson | 74/25 |
| 1,751,646 | 3/1930 | Niemân | 74/110 |
| 1,909,697 | 5/1933 | MacBeth et al. | 292/40 |
| 3,389,613 | 6/1968 | Turnbull | 74/110 |
| 3,827,309 | 8/1974 | Dooley | 74/110 |

FOREIGN PATENT DOCUMENTS

| | | | |
|---|---|---|---|
| 473,160 | 12/1949 | Italy | 292/34 |

OTHER PUBLICATIONS

Strasser–Straight–Line–Direction–Product Engineering, 2/1960, pp. 61, 63.

*Primary Examiner*—Benjamin W. Wyche
*Assistant Examiner*—Wesley S. Ratliff, Jr.
*Attorney, Agent, or Firm*—J. Harold Nissen

[57] ABSTRACT

A locking mechanism especially adapted to operate a multilatch locking device said mechanism comprising a housing supporting an axle, a rotatable plate mounted on said axle and having at least two pins projecting therefrom and at least two linearly displaceable plate members respectively coupled to said axle and said rotatable plate by means of a pair of slots substantially normally extending to each other in each of said plates. The slots in each linearly displaceable plate are adapted to respectively engage said axle and one of said pins, and the arrangement is such that upon the rotation of said rotatable plate each of the coupled plate members extends outwardly linearly from said axle.

10 Claims, 3 Drawing Figures

LOCKING MECHANISM

The present invention relates to locking mechanisms and more particularly to locking mechanisms especially adapted to operate a multilatch locking device.

Various multilatch locking devices are known in the art. Israel Patent No. 40820 discloses a locking arrangement comprising a multiplicity of elongated locking bars pivotally attached at one of their ends to a toothed wheel, which wheel is in mesh with and turnable by a gear.

In another arrangement described in Israel Patent No. 41701 a plurality of elongated bolts are pivotably affixed into a turnable disc and are adapted to extend substantially tangentially from said disc while the end of said bolt attached to said disc ascribes an arc with the rotation of said disc.

In accordance with the present invention there is provided a locking mechanism especially adapted to operate a multilatch locking device said mechanism comprising a housing supporting an axle, a rotatable plate mounted on said axle and having at least two pins projecting therefrom and at least two linearly displacable plate members, respectively coupled to said axle and said rotatable plate by means of a pair of slots substantially normally extending to each other in each of said plates, wherein the slots in each linearly displacable plate are adapted to respectively engage said axle and one of said pins, the arrangement being such that upon the rotation of said rotatable plate each of the coupled plate members extends outwardly linearly from said axle.

The mechanism of this invention facilitates a true linear displacement of the bolting or latching bars attachable at the free ends of the plate member in contradistinction with the tangential movement initiated by the rotation of a disc or gear to which the locking bars of the known arrangements are attached.

In a preferred arrangement according to the present invention, on each of the two surfaces of the rotatable plate there are affixed two pins projecting therefrom, said pins being diametrically opposite each other on an axis passing through said axle and the four pins being situated at 90° radial distance from each other. The fact that on each of the surfaces of the rotatable plate there are only two projecting pins situated at 180° radial distance from each other results in a better locking action since the rotatable plate is adapted to revolve through a radial distance of more than 90° and thereby is adapted to displace said plate members and the attached locking bars a relatively greater distance. Of course said displacement is a result of the interengagement and arrangement of the slots on the plate members and the manner in which they engage the axle and the respective pins as described herein.

Furthermore this arrangement allows for a small mechanism for a relatively large distance of displacement of the locking bars. In addition, as will become more apparent hereinafter, the design and arrangement proposed provides a locking mechanism having a relatively small depth and thus one which is particularly suitable to be installed also in thin walled doors or windows.

While the invention will now be described in connection with certain preferred embodiments in the following illustrative figures it will be understood that it is not intended to limit the invention to this particular embodiment. On the contrary it is intended to cover all alternatives, modifications and equivalents as may be included within the scope of the invention as defined by the appended claims. In the drawings:

Figure 1:
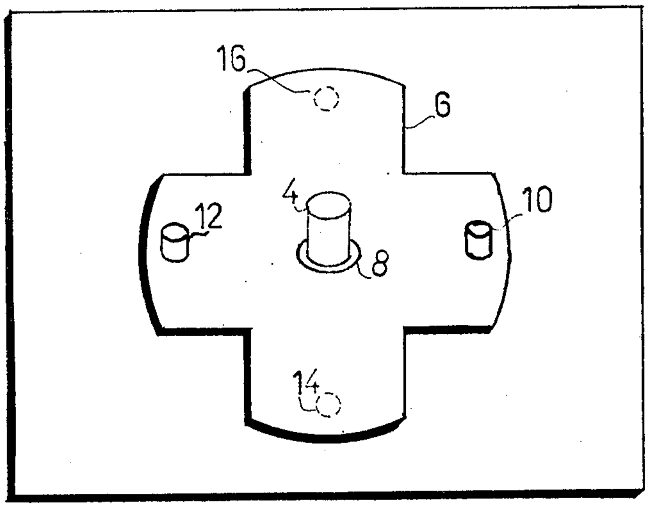
FIG. 1 is a perspective view of the housing and the rotatable plate of the locking mechanism according to the invention.

Turning to the drawings where a preferred embodiment is illustrated there is shown in FIG. 1 a housing or a base 2 supporting an axle 4 and a plate 6 having a central aperture 8 rotatably mounted on said axle. The rotatable plate 6 is provided with pins 10, 12 projecting from one surface of the plate and a second pair of pins 14, 16 projecting from the other surface of said plate 6. As seen, each pair of pins 10, 12 and 14, 16 are diametrically opposite each other on an axis passing through the axle 4 and each of the four pins is situated at 90° radial distance from each other.

It should be understood however, that a multilatch mechanism having three or even two latches can be made according to the present invention and in such an arrangement the pins need not be diametrically opposite each other or separated by a 90° radial distance from each other.

Figure 2:
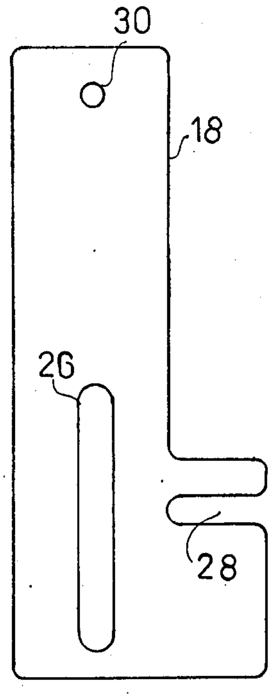
FIG. 2 is a plane view of a plate member according to the invention.

In FIG. 2 there is illustrated plate member 18 which is one of the plurality of identical plate members 18, 20, 22 and 24 which plate members and their interarrangement will be discussed in detail in connection with FIG. 3.

As seen in FIG. 2 the plate member 18 is substantially "L" shaped member having a pair of slots 26 and 28 which extend normally to each other. Slot 28 may extend to the edge of the plate member and can thus be an open-ended slot.

Each of the plate members may be further provided with an aperture 30 to which aperture there may be affixed a locking latch or bar (not shown) adapted to engage the stationary frame of a door or window to which the mechanism is attached.

Figure 3:
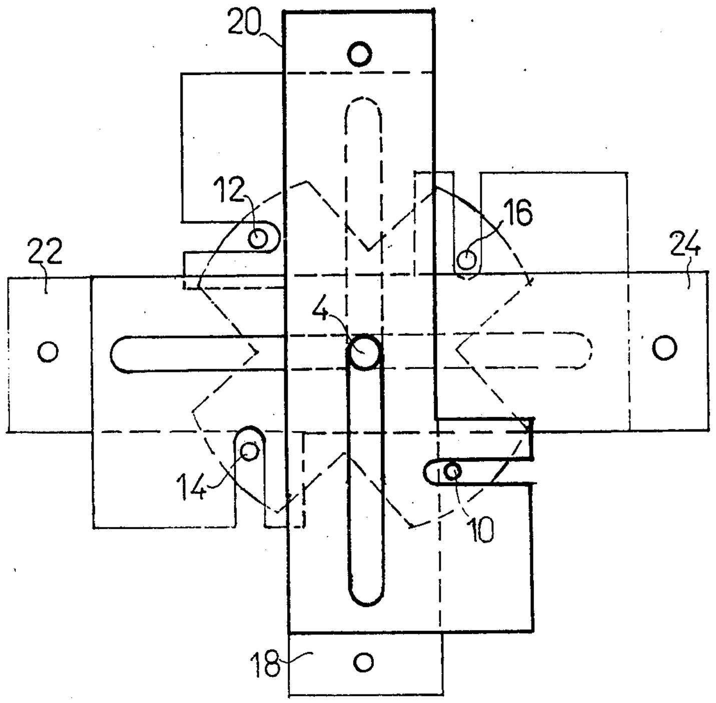
FIG. 3 illustrates the locking mechanism in its assembled unlocked state.

In FIG. 3 there is shown the manner in which the plate members are assembled with the rotating plate 6, to form a locking mechanism. As seen in the figure, each of the plate members 18, 20, 22 and 24 is adapted to respectively engage with its slots 26 and 28, the axle 4 and one of the pins 10, 12, 14 and 16 respectively. Thus two of the plates e.g., plates 18 and 20 will be mounted on one surface of plate 6 and plates 22 and 24 will be mounted on the other surface of said rotatably plate 6. The free end of one of the plate members, e.g., the end of member 22 may be attached to a dead bolt of an ordinary mortise lock already installed in a door, or to any other similar locking means.

In operation, when a linear movement is imparted to one of the plate members, e.g. by translation of the rotational movement of a key, said members will cause the rotating plate 6 to revolve by virtue of the pressure of slot 28 of said member on the pin disposed therein and said rotation will in turn result in that the remaining pins disposed in slots 28 of the other members will exert a pressure against said slots thereby causing the linear movement of each of said members. As seen, the rotational movement of said rotating plate is translated into a linear movement of the plate members by virtue of the interengagement of axle 4 with slots 26 of each member which serves to guide the movement of said members along the axis of their respective slots 26.

It should be recognized that the shape of the rotatable plate 6 and that of the plate members should be varied from the illustrated one and that said component parts can be made of any suitable material such as metal or hard plastic material or a combination thereof. Thus said rotatable plate can obviously alternatively be circular or square and said plate members can be rectangular, trapezoidal etc.

Finally, it will be evident to those skilled in the art that the invention is not limited to the details of the foregoing illustrative embodiments and that the present invention may be embodied in other specific forms without departing from the spirit or essential attributes thereof, and it is therefore desired that the present embodiments be considered in all respects as illustrative and not restrictive, reference being made to the appended claims, rather than to the foregoing description, in which it is intended to claim all modifications coming within the scope and spirit of the invention.

What is claimed is:

1. A locking mechanism to operate a latching means of multilatch locking device, comprising:

a housing supporting an axle;

a rotatable plate having a central aperture receiving said axle rotatably coupling said rotatable plate thereto, said plate having at least two projecting pins displaced from each other;

at least two linearly displaceable plate members including linkages freely linking said plate members to said rotatable plate and to said axle for transverse linear movement relative to each other and to said axle, said linkages including in each said plate member a pair of slots extending substantially normally to each other, one of said slots extending axially of said plate member and linking thereof to said axle to provide a common connection among said plate members and said axle, and the other of said slots linking said plate member solely to one of said projecting pins; and, the arrangement being such that upon rotation of said rotatable plate each of said linearly displaceable plate members freely extends outwardly linearly from each other and from said axle to facilitate and effect a linear displacement of the latching means of said multilatch locking device.

2. The mechanism as claimed in claim 1 wherein at least one pin projects from each surface of said plate.

3. The mechanism as claimed in claim 1 comprising four pins symmetrically distributed about said axle on both surfaces of said plate.

4. The mechanism as claimed in claim 1 wherein said plate members are adapted to be attached to bolting bars extending therefrom which bars are in turn adapted to move linearly with the movement of said members.

5. The mechanism as claimed in claim 1 wherein said plate members are substantially "L" shaped members.

6. The mechanism as claimed in claim 1 wherein the slot adapted to engage a pin of said rotatable plate extends to the edge of said member and is an open ended slot.

7. A locking device comprising the locking mechanism of claim 1, comprising:

connectors at the ends of said plate members, said connectors being aligned with said axially extending slots;

bolting bars connected with said connectors and extending from said plate members to move linearly therewith upon rotation of said rotatable plate, said bolting bars forming part of said latching means.

8. The locking device as claimed in claim 7, wherein said plate members are substantially "L" shaped;

said slot linking said plate members to said axle extends along the long leg of said "L" shaped member, and said slot linking said plate members to said rotatable plate extends along the short leg of said "L" shaped member.

9. The locking device as claimed in claim 8, comprising:

four pins;

one pair of said pins being on one surface of said rotatable plate and the other pair being on the other surface of said rotatable plate;

each said pair of pins being diametrically opposite to each other on an axis passing through said axle and being displaced 90° radially from said other pins.

10. The locking mechanism as claimed in claim 1, comprising:

four pins;

one pair of said pins being on one surface of said rotatable plate and the other pair of said pins being on the other surface of said rotatable plate;

each said pair of said pins being diametrically opposite to each other on an axis passing through said axle and being displaced 90° radially from said other pins; and wherein, said plate members are substantially "L" shaped and include connectors at the end of its long leg;

said slot linking said plate members to said axle extends along the long leg of said "L" shaped member, and said slot linking said plate members to said rotatable plate extends along the short leg of said "L" shaped member, and said connectors being aligned with said axially extending slots for movement linearly with the movement of said plate members and along axes transverse to each other and passing through said axle.

* * * * *